United States Patent [19]

Hayton

[11] Patent Number: 5,078,576
[45] Date of Patent: Jan. 7, 1992

[54] MOUNTING SYSTEM FOR ENGINE COMPONENTS HAVING DISSIMILAR COEFFICIENTS OF THERMAL EXPANSION

[75] Inventor: Paul R. Hayton, Watford, England

[73] Assignee: Rolls-Royce PLC, London, England

[21] Appl. No.: 545,640

[22] Filed: Jun. 29, 1990

[30] Foreign Application Priority Data

Jul. 6, 1989 [GB] United Kingdom ............... 8915469

[51] Int. Cl.$^5$ .............................................. F01D 9/00
[52] U.S. Cl. .................. 415/209.3; 415/134; 415/189; 415/200
[58] Field of Search ............... 415/137, 139, 189, 190, 415/191, 200, 208.1, 208.2, 209.2, 209.3, 209.4, 210.1, 134, 136, 138

[56] References Cited

U.S. PATENT DOCUMENTS

| | | | |
|---|---|---|---|
| 2,488,875 | 11/1949 | Morley | 415/209.3 |
| 2,738,949 | 3/1956 | Wilkinson | 415/209.4 |
| 3,521,974 | 7/1970 | Zerlauth | 415/208.1 |
| 4,009,969 | 3/1977 | Kadera et al. | 415/209.3 |
| 4,076,451 | 2/1978 | Jankot | 415/209.4 |
| 4,245,954 | 1/1981 | Glenn | 415/209.3 |
| 4,384,822 | 5/1983 | Schweikl et al. | 415/137 |

FOREIGN PATENT DOCUMENTS

| | | | |
|---|---|---|---|
| 0000605 | 1/1987 | Japan | 415/200 |
| 485102 | 5/1938 | United Kingdom . | |
| 2056258 | 3/1981 | United Kingdom . | |

Primary Examiner—John T. Kwon
Assistant Examiner—Christopher M. Verdier
Attorney, Agent, or Firm—Oliff & Berridge

[57] ABSTRACT

In a gas turbine engine having a ceramic nozzle guide vane supported by a metal turbine casing the radially outer end of the vane is provided with opposed frustoconical sections which converge towards each other onto a middle cylindrical section. A metal split ring surrounds the cylindrical section, and the radially inner and outer ends of the ring abut the frustoconical sections. The split ring is provided with a flange which cooperates with a groove structure on the turbine casing, thus enclosing the split ring to the casing. A bolt means fastens together two sections of the casing either side of the vane, thereby holding the split ring against the vane. On increase in temperature the split ring expands more than does the vane. The ends of the split ring therefore slide against the frustoconical surfaces of the vane to take up the expansion, and in so doing maintain contact with the vane.

11 Claims, 3 Drawing Sheets

MOUNTING SYSTEM FOR ENGINE COMPONENTS HAVING DISSIMILAR COEFFICIENTS OF THERMAL EXPANSION

BACKGROUND OF THE INVENTION

1. Field of The Invention

This invention concerns improvements in the mounting of engine components having dissimilar coefficients of thermal expansion, and relates to the mounting of components in high temperature regions of a gas turbine engine.

2. Discussion Of The Prior Art

In the operation of a gas turbine engine, air at atmospheric pressure is initially compressed by a compressor and delivered to a combustion stage. In the combustion stage heat is added to the air leaving the compressor by adding fuel to the air and burning it. The gas flow resulting from combustion of fuel in the combustion stage then expands through a turbine, delivering up some of its energy to drive the turbine and produce mechanical power.

In order to produce a driving torque, the turbine consists of one or more stages, each employing one row of stationary nozzle guide vanes and one row of moving blades mounted on or integral with a disc. The nozzle guide vanes are aerodynamically designed to direct incoming gas from the combustion stage onto the turbine blades and thereby transfer kinetic energy to the blades.

The gases entering the turbine typically have an entry temperature from 850° to at least 1700° C. Since the efficiency and power output of the turbine are related to the entry temperature of the incoming gases there is a trend in gas turbine engine technology to increase the gas temperature. A consequence of this is that the materials of which the blades and vanes are made assume ever-increasing importance with a view to resisting the effects of elevated temperature.

Historically, nozzle guide vanes have been made of metals such as high temperature steels and, latterly, nickel alloys, and it has been found necessary to provide internal cooling passages in order to prevent melting. It has been found that ceramic coatings can enhance the heat resistance of nozzle guide vanes, and, in specialised applications, nozzle guide vanes are being made entirely of ceramic, thus imparting resistance to even higher gas entry temperatures.

However, if the nozzle guide vanes are made of ceramic, which has a different coefficient of thermal expansion to that of a metal supporting structure, then undesirable thermal stresses will be set up between the nozzle guide vanes and their supports when the engine is operating. Such undesirable thermal stresses cannot adequately be contained by cooling.

It is an object of the present invention to provide in the turbine section of a gas turbine engine an assembly of a nozzle guide vane and a supporting structure which is designed to minimise thermal stresses in the assembly when the nozzle guide vane and the supporting structure are made of materials having different coefficients of thermal expansion.

SUMMARY OF THE INVENTION

According to the present invention there is provided a structure for supporting a first member having a first coefficient of linear thermal expansion by means of a second member having a second coefficient of linear thermal expansion greater than the first coefficient so as to maintain supportive contact between the members under conditions of differential thermal expansion between the members, the structure comprising, (a) incorporated in the first member an intermediate section located on an axis between two further sections, the two further sections being each wider in a direction at right angles to the axis than the intermediate section in that direction, the intermediate section being connected to each said further section by a respective frustoconical transition surface, line extensions of each frustoconical surface meeting at a common point on said axis, and (b) a support member held by the second member and located between the second member and the first member in a region between said two further sections, the support member being shaped to abut said frustoconical transition surfaces and to move over said surfaces under conditions of relative thermal expansion of the first and second members, the support member having the second coefficient of expansion.

Preferably, the intermediate section is cylindrical.

The support member may be provided by a split ring, each end of which is internally chamfered to abut the respective frustoconical transition surface.

The second member preferably surrounds and is substantially coaxial with the first member.

The split ring may be provided with a flange adapted to locate in a corresponding aperture in the second member.

DESCRIPTION OF THE DRAWINGS

The invention will now be described by way of example only with reference to the accompanying non-scale diagrammatic drawings in which.

DESCRIPTION OF THE PREFERRED EMBODIMENTS

Figure 1:
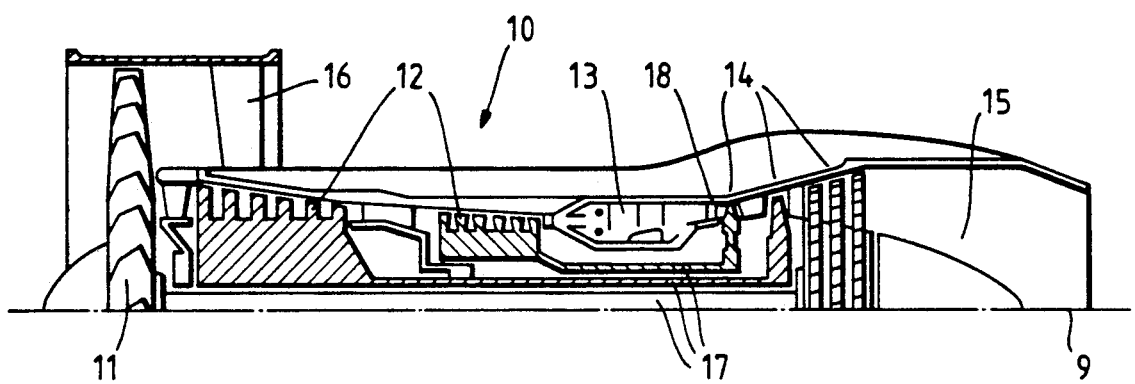
FIG. 1 is a sectioned side view of a part of a ducted fan gas turbine engine which incorporates a nozzle guide vane mounting system according to the present invention.

Referring to FIG. 1, a ducted fan gas turbine engine, generally indicated at 10, comprises, in axial fluid flow series, a ducted fan 11, a compressor section 12, combustion equipment 13, a turbine section 14 and a propulsion nozzle 15. The engine 10 functions in the conventional manner with air compressed by the ducted fan 11 being split into two flows. The first is directed through outlet guide vanes 16 to provide propulsive thrust whilst the second is directed into the compressor section 12 where it is compressed still further. This compressed air is then directed into the combustion equipment 13 where it is mixed with fuel and the mixture combusted to provide hot gases which expand through the turbine section 14 and are exhausted to atmosphere through the nozzle 15 to provide propulsive thrust. The turbine section 14 is interconnected with the compressor section 12 and the ducted fan 11 by means of shafts 17.

The turbine section 14 includes an annular array of ceramic nozzle guide vanes 18 which is located immediately downstream of the combustion equipment 13. Each nozzle guide vane 18, one of which is shown in greater detail in FIG. 2, comprises: an aerofoil portion 19, radially inner and outer platforms 20 and 21 respectively which define radially inner and outer extents of a portion 22 of the gas passage through the turbine section 14, and a radially outermost portion 23 located radially outwards of outer platform 21.

"Radially" will be understood to mean substantially at right angles to the longitudinal axis of the engine shown at 9 in FIG. 1.

Figure 2:
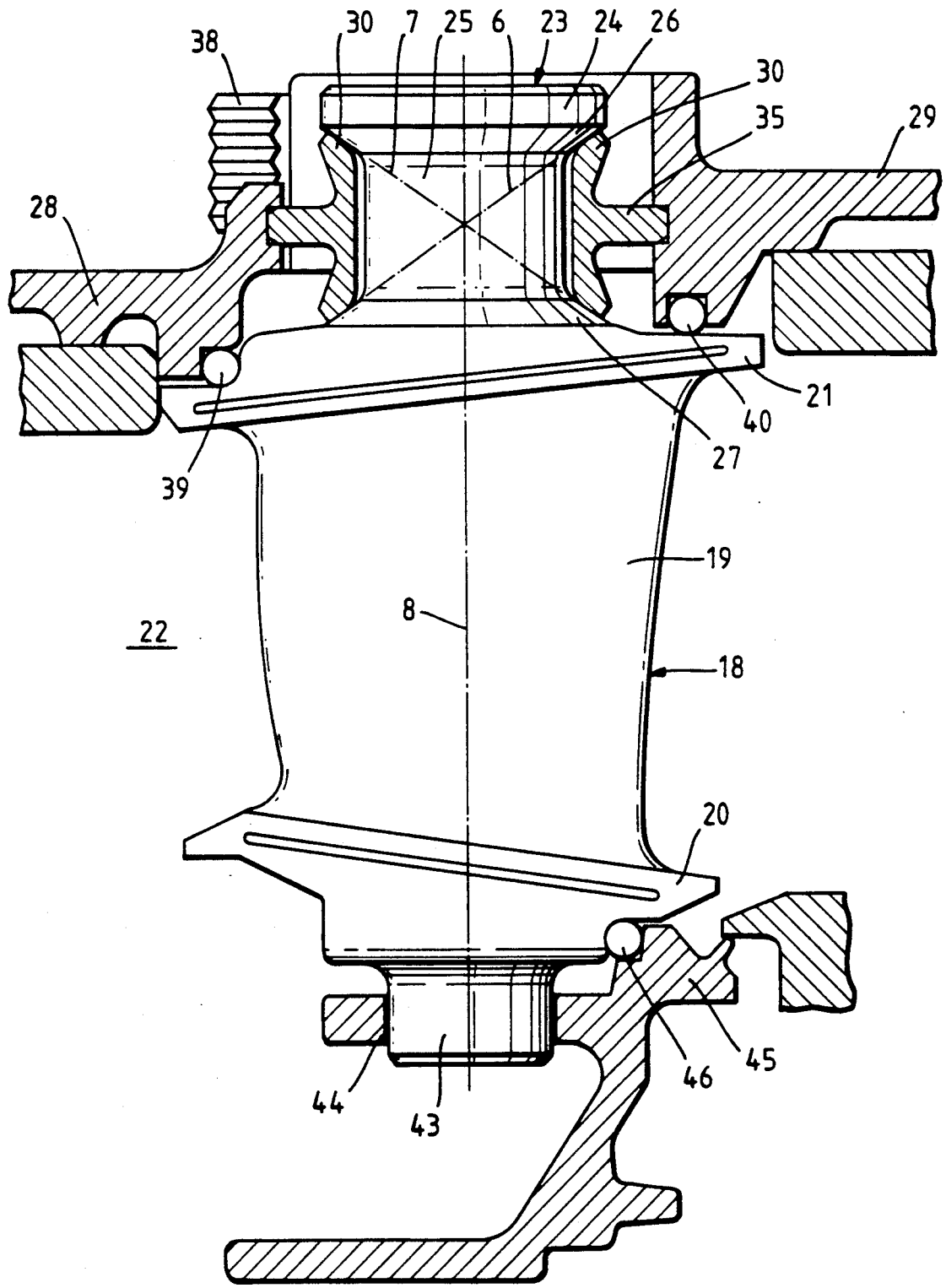
FIG. 2 is a sectioned side view of part of the turbine section of the engine of FIG. 1 showing the nozzle guide vane mounting system including a split ring.
Figure 3:
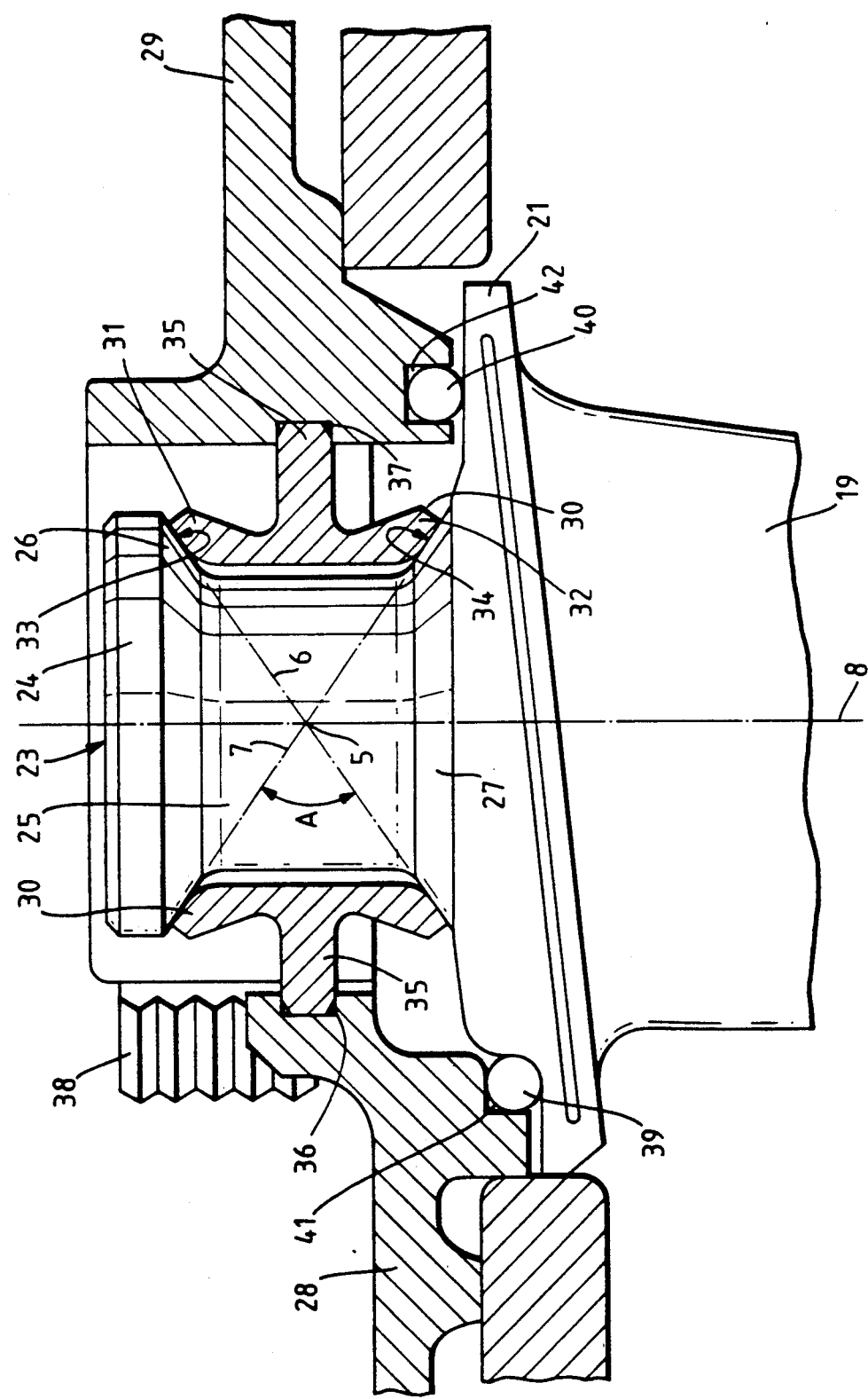
FIG. 3 is a detail view of the mounting system of FIG. 2, and FIGS. 4 and 5 show modifications to the split ring of FIGS. 2 and 3.

As shown in FIGS. 2 and 3, the radially outermost portion 23 of nozzle guide vane 18 comprises: a radially outer cylindrical section 24, an intermediate cylindrical section 25 located radially inwards of the outer cylindrical section, the sections 24 and 25 having a common radially directed axis 8 and the outer section 24 having a diameter greater than that of the intermediate section 25, an integral first frustoconical section 26 connecting the radially inner end of the outer cylindrical section 24 to the radially outer end of the intermediate cylindrical section 25, and an integral second frustoconical section 27 connecting the radially inner end of the intermediate cylindrical section 25 to the outer platform 21, the frustoconical section 27 tapering from the platform 21 to the intermediate section 25. Line extensions 6,7 of frustoconical sections 26,27 respectively meet at a common point 5 on radial axis 8.

The outer end 23 of the nozzle guide vane 18 is supported between turbine casing forward and rearward sections 28, 29 respectively, by means of a metal split ring 30 surrounding the outer end 23 of the nozzle guide vane between the outer cylindrical section 24 and the outer platform 21.

The split ring 30 has a radially outer end 31 and a radially inner end 32. The inner surface 33 of the radially outer end 31 of the ring 30 is chamfered so as to be in mating abutment with the surface of the first frustoconical section 26; likewise, the inner surface 34 of the radially inner end 32 of the ring is chamfered so as to be in mating abutment with the surface of the second frustoconical section 27. The dimensions of the ring 30 are such that the remainder of the inner surface between the chamfered ends 31, 32 is spaced from the intermediate cylindrical portion 25, as shown in FIG. 3.

The split ring 30 is further provided with an equatorially located circumferential flange 35 which is adapted to locate and fit in corresponding grooves 36, 37 in turbine casing sections 28, 29 respectively.

The forward and rearward sections 28, 29 of the turbine casing are secured together by a locking insert assembly 38, shown generally in FIGS. 2 and 3. The securing together of the turbine casing sections 28, 29 by the locking insert assembly 38 maintains the split ring 30 in abutment with the outermost portion 23 of the vane 18.

Sealing is provided between sections 28 and 29 of the turbine casing and the outer platform 21 by means of wire braid seals 39, 40 located in seal grooves 41, 42 in casing sections 28, 29 respectively. However, at temperatures near or at the operating limit of the braid seals 39,40 it may be preferred to provide sealing solely by a small gap between the turbine casing and the outer platform, which gap closes under thermal expansion.

The ceramic guide vane 18 is further provided at its root with an integral spigot or pin 43 located radially inwards of the inner platform and arranged to fit in an aperture 44 in a supporting seal ring interstage 45. A braided seal wire 46 is provided between the seal ring interstage 45 and the radially inner face of the inner platform 20.

In operation of a gas turbine engine incorporating the above described features of the invention the metal structures expand thermally more than the ceramic vane 18. The turbine casing sections 28,29 clamp the split ring 30 together by virtue of the locking insert assembly 38, and retain the split ring 30 in a fixed location relative to the turbine casing by virtue of the location of the ring flange 35 in grooves 36,37. Under heat, the metal split ring 30 expands in all directions more than the ceramic cylindrical sections 25,26,27 do in all directions. To compensate for the difference in expansion, the line extensions 6,7 of the frustoconical surfaces 26,27 intersect at the single point 5 on the radial axis 8. The consequence of this is that the expansion of the ceramic and metal parts is in the same direction, which is along the axis of the cone; therefore, the faces 33,34 of the ring 30 are always in contact with the respective frustoconical surfaces 26,27 thereby to react the gas loads on the forward section 28 of the turbine casing and the seal ring interstage 45. The angle A between the line extensions 5,6 is ideally a right angle. The design is still functional if angle A is not a right angle, but stresses in the intermediate cylindrical section 25 may be higher as a result.

The spacing between the ring 30 and the intermediate cylindrical portion 25 of the vane 18 provides room for flexibility of the ring under thermal expansion forces and variations in gas loadings and to take account of any out-of-alignment of mating or load bearing surfaces due to manufacturing tolerances.

The location of pin 43 at the root of vane 18 in the aperture 44 of seal ring interstage 45 and the flexibility provided by split ring 30 between its mounting faces (33 and 34 with 35), ensures that the gas load on the seal interstage 45 is carried evenly by the nozzle vanes.

Figure 4:
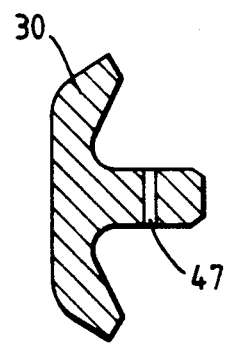
Figure 5:
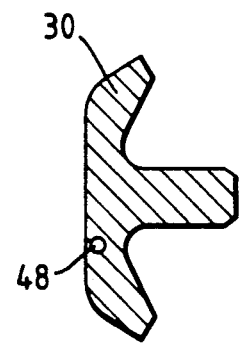

Modifications to the split ring 30 are shown in FIGS. 4 and 5. Because the ring 30 is in contact with the uncooled ceramic of the vane it may be necessary to cool the ring by introducing cooling holes or slots 47,48 as shown in FIGS. 4 and 5. An alternative possibility is to make the ring 30 of a high cobalt alloy. However, it is found that a slot or cooling hole in the ring will improve the flexibility of the ring.

In assembly, prior to bolting together the forward and rearward sections 28, 29 of the turbine casing, the vanes and split rings are allowed to move to take up manufacturing tolerances. This minimises any residual stresses which could be induced prior to running the engine.

The invention may be applied to structures other than gas turbine engines where it is necessary to support a member having a first coefficient of expansion by another member having a second, greater, coefficient of expansion. Although the invention has been described with reference to ceramic nozzle guide vanes in gas turbine engines it will be understood that it may be applied to structures that are essentially planar in character rather than three-dimensional.

I claim:

1. A structure for supporting a first member having a first coefficient of linear thermal expansion by means of a second member having a second coefficient of linear thermal expansion greater than the first coefficient so as to maintain supportive contact between the members under conditions of differential thermal expansion between the members, the structure comprising, (a) incorporated in the first member an intermediate section located on an axis between two further sections, the two further sections being each wider in a direction at right angles to the axis than the intermediate section in that direction, the intermediate section being connected to each said further section by a respective frustoconical transition surface, line extensions of each frustoconical surface meeting at a common point on said axis, and (b) a support member held by the second member and located between the second member and the first member in a region between said two further sections, the support member being shaped to abut said frustoconical transition surfaces and to move over said surfaces under conditions of relative thermal expansion of the first and second members, the support member having the second coefficient of expansion.

2. A structure as claimed in claim 1 wherein the second member surrounds and is substantially coaxial with the first member.

3. A structure as claimed in claim 1 wherein the support member is provided by a split ring, at least one end of which is internally chamfered to abut the respective transition surface.

4. A structure as claimed in claim 3, wherein the split ring is provided with a circumferential flange and the second member is provided with an aperture to receive said flange whereby the split ring is retained in position by the second member.

5. A structure as claimed in claim 1 wherein the intermediate section is cylindrical.

6. A structure as claimed in claim 1 wherein the support member is spaced from the intermediate section.

7. A structure as claimed in claim 1 wherein the first member comprises a radially outer portion of a nozzle guide vane of a gas turbine engine and the second member comprises a portion or portions of a turbine casing.

8. A structure as claimed in claim 7 wherein the nozzle guide vane is made of ceramic material and the second member, including the support member, is made of metal.

9. A structure as claimed in claim 7 wherein the nozzle guide vane is provided at its radially inner end with a pin adapted to be inserted in a locating aperture in a seal ring interstage of the engine.

10. A structure as claimed in claim 1 wherein the angle between the line extensions of the frustoconical surfaces is substantially a right angle.

11. A structure as claimed in claim 3 wherein the split ring is provided with a cooling hole or slot.

* * * * *